US009178394B2

(12) United States Patent
Asahi et al.

(10) Patent No.: US 9,178,394 B2
(45) Date of Patent: Nov. 3, 2015

(54) ROTOR AND MANUFACTURING PROCESS OF ROTOR

(71) Applicant: Nidec Corporation, Kyoto (JP)

(72) Inventors: Kyohei Asahi, Kyoto (JP); Kenichiro Hamagishi, Kyoto (JP); Kuniaki Tanaka, Kyoto (JP); Susumu Terada, Kyoto (JP)

(73) Assignee: Nidec Corporation, Kyoto (JP)

( * ) Notice: Subject to any disclaimer, the term of this patent is extended or adjusted under 35 U.S.C. 154(b) by 395 days.

(21) Appl. No.: 13/735,138

(22) Filed: Jan. 7, 2013

(65) Prior Publication Data

US 2014/0042834 A1 Feb. 13, 2014

Related U.S. Application Data

(60) Provisional application No. 61/680,800, filed on Aug. 8, 2012.

(30) Foreign Application Priority Data

Aug. 7, 2012 (JP) ................................. 2011-174770

(51) Int. Cl.
*H02K 1/27* (2006.01)
*H02K 15/03* (2006.01)
*H02K 1/04* (2006.01)
*H02K 15/12* (2006.01)

(52) U.S. Cl.
CPC .................. *H02K 1/276* (2013.01); *H02K 1/04* (2013.01); *H02K 1/2773* (2013.01); *H02K 15/03* (2013.01); *H02K 15/12* (2013.01)

(58) Field of Classification Search
CPC ................................ H02K 1/04; H02K 1/276
See application file for complete search history.

(56) References Cited

U.S. PATENT DOCUMENTS

| 7,679,252 | B2 | 3/2010 | Iwase et al. | |
|---|---|---|---|---|
| 8,020,280 | B2 * | 9/2011 | Fukumaru | H02K 1/2766 264/272.2 |
| 8,922,083 | B2 * | 12/2014 | Asahi | H02K 1/2706 310/156.08 |
| 2009/0174273 | A1 * | 7/2009 | Watanabe | H02K 15/03 310/156.53 |
| 2014/0124978 | A1 * | 5/2014 | Mabu | H01F 7/0221 264/261 |

FOREIGN PATENT DOCUMENTS

JP 2010-063285 A 3/2010

* cited by examiner

*Primary Examiner* — Dang Le
(74) *Attorney, Agent, or Firm* — Keating & Bennett, LLP

(57) ABSTRACT

A rotor includes a laminated core, a plurality of magnets, and a resin portion. The laminated core includes a plurality of outer core portions arranged in a circumferential direction. The plurality of outer core portions and the plurality of magnets are alternately arranged in the circumferential direction. In addition, the outer core portion includes a through-hole that penetrates in an axial direction. The resin portion includes a columnar portion that is disposed inside the through-hole. Accordingly, the rigidity of the resin portion is enhanced. In addition, the resin portion includes a gate mark portion. At least a portion of the gate mark portion is positioned farther radially inward than the through-hole.

10 Claims, 11 Drawing Sheets

ROTOR AND MANUFACTURING PROCESS OF ROTOR

BACKGROUND OF THE INVENTION

1. Field of the Invention

The present invention relates to a motor, a rotor, and a manufacturing process of the rotor.

2. Description of the Related Art

A so-called inner rotor type motor in which a rotor is disposed inside an armature is known. The types of rotors used in the inner rotor type motor are mainly classified into an SPM (Surface Permanent Magnet) type rotor in which a plurality of magnets are attached to the outer circumferential surface of a rotor core and an IPM (Interior Permanent Magnet) type rotor in which magnets are buried into a rotor core.

When the SPM type rotor is used, the armature and the magnets can be placed in proximity to each other. Therefore, the magnetic force of the magnets can be effectively used. However, in the SPM type rotor, measures to prevent the magnets from escaping outward due to a centrifugal force during high-speed rotation need to be prepared. On the other hand, when the IPM type rotor is used, there is no concern of the magnets escaping due to the centrifugal force. Therefore, recently, the IPM type rotor has been the mainstream.

However, in general, in any of the SPM type and IPM type rotors, each of the magnets is disposed so that a pair of magnetic pole surfaces are respectively directed radially outward and radially inward. Therefore, only the magnetic pole surface on the radially outside surface of the magnet contributes to motor driving. In order to effectively use the pair of magnetic pole surfaces of the magnet, a rotor structure in which magnets and cores of magnetic bodies are alternately arranged in the circumferential direction has been proposed.

A conventional rotor in which the magnets and the cores are alternately arranged in the circumferential direction is disclosed in, for example, Japanese Patent Application Publication no. 2010-063285. The rotor in Japanese Patent Application Publication no. 2010-063285 includes a rotor core, and substantially rectangular parallelepiped-shaped magnets accommodated in a plurality of slots formed in the rotator core, respectively (See, for example, paragraph [0059] of Japanese Patent Application Publication no. 2010-063285). In addition, in Japanese Patent Application Publication no. 2010-063285, the entirety of the magnets of the rotor are covered with a sealing resin (See, for example, paragraph 0063 of Japanese Patent Application Publication no. 2010-063285). Accordingly, the holding force of the magnets is increased (See, for example, paragraph [0064] of Japanese Patent Application Publication no. 2010-063285).

In FIG. 5 of Japanese Patent Application Publication no. 2010-063285, a gate through which the sealing resin is injected into a forming mold is provided at an upward position in the vicinity of the end portion on the radial outside of the magnets. According to the related art, it is thought that the gate is disposed in such a position because it is important to reliably cover the radially outside surface of the magnets with the sealing resin. However, when the position of the gate is eccentrically disposed radially outward, it is difficult for the resin to flow uniformly toward a through-hole positioned farther radially inward than the gate and toward the radial inner side of the magnets. In order to increase the rigidity of the sealing resin, molding the sealing resin with favorable accuracy even in the through-hole and on the radial inside of the magnets is required.

SUMMARY OF THE INVENTION

Preferred embodiments of the present invention provide a technique capable of significantly reducing and preventing a concentration of injection pressure of a molten resin on a portion of a rotor in which a plurality of outer core portions and a plurality of magnets are alternately arranged in a circumferential direction and which includes a resin portion that covers the outer core portions and the magnets so as to mold each of the portions of the resin portion with favorable accuracy.

A first preferred embodiment of the present invention provides a rotor preferably for use in an inner rotor type motor, including a plurality of magnets which are arranged in a circumferential direction around a center axis that extends in a vertical direction; a laminated core in which a plurality of thin plate cores are laminated in an axial direction; and a resin portion which is obtained by injection molding, wherein the laminated core includes an inner core portion which axially extends in a cylindrical shape in a region located farther radially inward than the plurality of magnets, and a plurality of outer core portions which are arranged in the circumferential direction in a region located farther radially outward than the inner core portion, the plurality of outer core portions and the plurality of magnets are alternately arranged in the circumferential direction, the plurality of magnets each include a pair of end surfaces in the circumferential direction which are magnetic pole surfaces, the magnetic pole surfaces of the plurality of magnets of the same pole face each other in the circumferential direction, the outer core portion includes a through-hole which penetrates in the axial direction, the resin portion includes an upper resin portion which covers upper surfaces of the laminated core and the plurality of magnets, a lower resin portion which covers lower surfaces of the laminated core and the plurality of magnets, an outer resin portion which covers radially outside surfaces of the plurality of magnets, and a columnar portion which extends in the axial direction in the through-hole and connects the upper resin portion to the lower resin portion, the resin portion includes a gate mark portion at which a gate of a mold is positioned during injection molding, the gate mark portion is positioned farther radially outward than the inner core portion, and at least a portion of the gate mark portion is positioned farther radially inward than the through-hole in plan view.

A second preferred embodiment of the present invention provides a manufacturing process of a rotor which includes a plurality of magnets which are arranged in a circumferential direction around a center axis that extends in a vertical direction, a laminated core which includes an inner core portion that axially extends in a cylindrical shape, a plurality of outer core portions that are arranged in a circumferential direction farther radially outward than the inner core portion, and a through-hole which penetrates the outer core portion in the axial direction, and a resin portion, including the steps of: a) disposing the laminated core and the plurality of magnets in a mold; b) injecting a molten resin into the mold via a gate of the mold; and c) solidifying the molten resin to thereby obtain the resin portion, wherein, in the step a), the plurality of outer core portions and the plurality of magnets are alternately arranged in the circumferential direction, and in the step b), the gate is positioned farther radially outward than the inner core portion, at least a portion of the gate is positioned farther radially inward than the through-hole, and the molten resin is injected from the gate toward upper surfaces of the laminated core and the plurality of magnets, lower surfaces of the laminated core and the plurality of magnets, and radial outside surfaces of the plurality of magnets, and into the through-hole.

According to the first preferred embodiment of the present invention, the rigidity of the resin portion is enhanced by the columnar portion disposed inside the through-hole. In addition, at least a portion of the gate mark portion is positioned farther radially inward than the through-hole. Therefore, during injection molding, the molten resin discharged from the gate comes into contact with the upper surface of the laminated core or the plurality of magnets and spreads out. As a result, the concentration of the injection pressure of the molten resin on the through-hole is significantly reduced and prevented. Therefore, the molten resin efficiently spreads out. As a result, each of the portions of the resin portion is molded with favorable accuracy.

According to the second preferred embodiment of the present invention, the rigidity of the resin portion is enhanced by the columnar portion disposed inside the through-hole. In addition, at least a portion of the gate is positioned farther radially inward than the through-hole. Therefore, the molten resin discharged from the gate comes into contact with the upper surface of the laminated core or the plurality of magnets and spreads out. At this time, the concentration of the injection pressure of the molten resin on the through-hole is significantly reduced and prevented. Therefore, the molten resin efficiently spreads out. As a result, each of the portions of the resin portion is molded with favorable accuracy.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the drawings. In addition, in the present application, a direction parallel to the center axis of a rotor is referred to as an "axial direction", a direction orthogonal to the center axis of the rotor is referred to as a "radial direction", and a direction along the circular arc around the center axis of the rotor is referred to as a "circumferential direction". In addition, in the present application, shapes and positional relations of units will be described using the axial direction as a vertical direction. However, there is no intention of limiting the directions in the use and manufacture of the rotor and a motor according to various preferred embodiments of the present invention due to the definition of the vertical direction.

In addition, in the present application, the "parallel direction" also includes a substantially parallel direction. In addition, in the present application, the "orthogonal direction" also includes a substantially orthogonal direction.

First Preferred Embodiment

Figure 1:
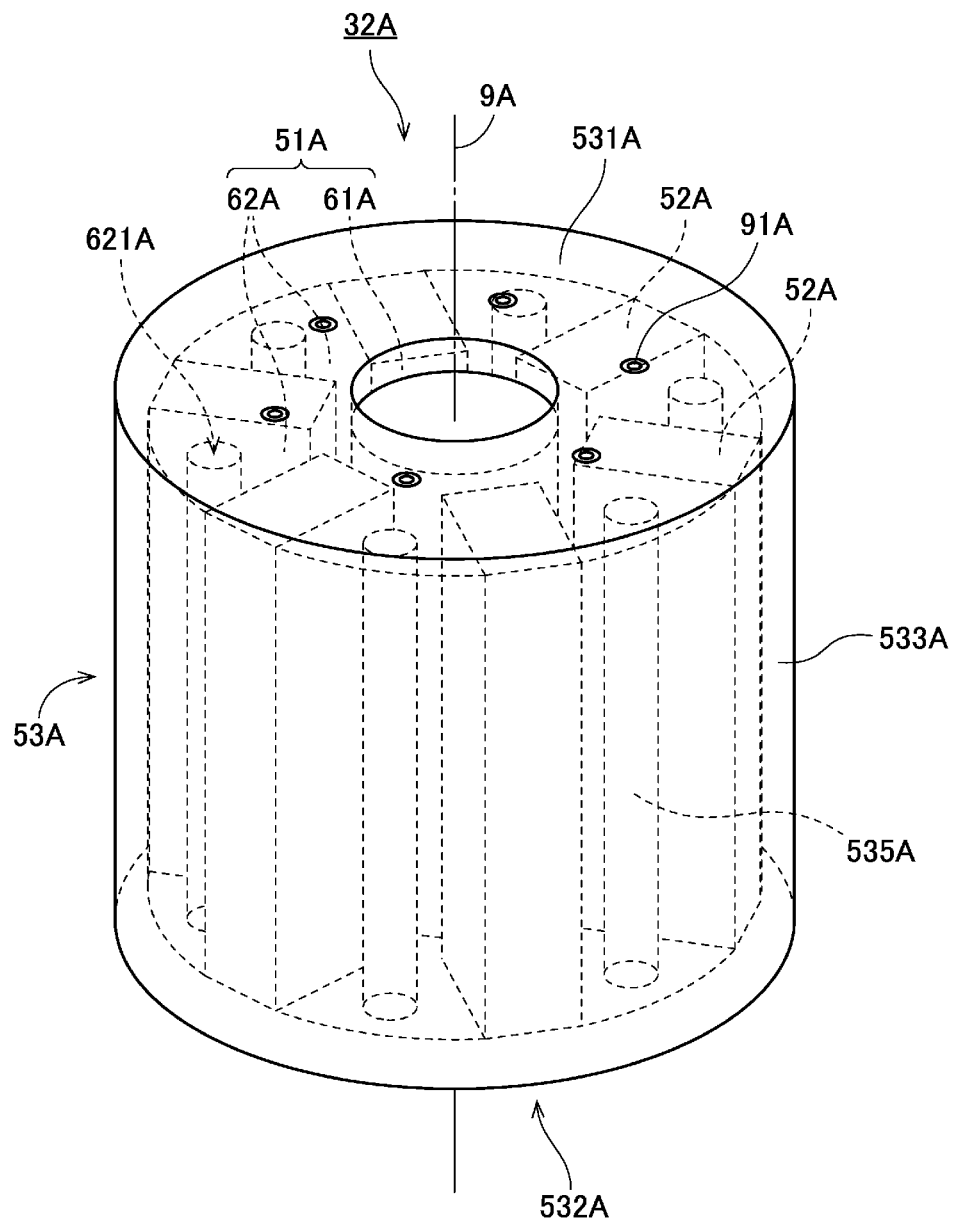
FIG. 1 is a perspective view of a rotor according to a first preferred embodiment of the present invention.

FIG. 1 is a perspective view of a rotor 32A according to a first preferred embodiment of the present invention. The rotor 32A is preferably for use in an inner rotor type motor. As illustrated in FIG. 1, the rotor 32A preferably includes a laminated core 51A, a plurality of magnets 52A, and a resin portion 53A. The laminated core 51A is preferably defined by a plurality of thin plate cores laminated in the axial direction. The plurality of magnets 52A are arranged in the circumferential direction around a center axis 9A extending vertically. The resin portion 53A is preferably obtained by, for example, injection molding.

The laminated core 51A preferably includes an inner core portion 61A and a plurality of outer core portions 62A. The inner core portion 61A axially extends in a cylindrical shape in a region located farther radially inward than the magnets 52A. The plurality of outer core portions 62A are arranged in the circumferential direction in a region located farther radially outward than the inner core portion 61A. Each of the plurality of outer core portions 62A includes a through-hole 621A that penetrates in the axial direction. The plurality of outer core portions 62A and the plurality of magnets 52A are alternately arranged in the circumferential direction. The magnet 52A includes a pair of end surfaces in the circumferential direction which are magnetic pole surfaces. In addition, the plurality of magnets 52A are arranged so that the magnetic pole surfaces of the same pole face each other in the circumferential direction.

The resin portion 53A preferably includes an upper resin portion 531A, a lower resin portion 532A, an outer resin portion 533A, and a columnar portion 535A. The upper resin portion 531A covers the upper surfaces of the laminated core 51A and the magnets 52A. The lower resin portion 532A covers the lower surfaces of the laminated core 51A and the magnets 52A. The outer resin portion 533A covers the radially outside surfaces of the magnets 52A. The columnar portion 535A extends in the axial direction inside the through-hole 621A. The upper resin portion 531A and the lower resin portion 532A are connected by the columnar portion 535A. Accordingly, the rigidity of the resin portion 53A is increased.

In addition, term "cover" used herein means not only to cover the entire surface of an object but also to cover a portion of the surface of an object. For example, the entire radially outside surface of the magnet 52A may be covered with the outer resin portion 533A, or only a portion of the radially outside surface of the magnet 52A may be covered with the outer resin portion 533A.

In addition, as illustrated in FIG. 1, the resin portion 53A preferably includes a plurality of gate mark portions 91A. The plurality of gate mark portions 91A are provided at points where gates of a mold are positioned during injection molding of the resin portion 53A. Each of the gate mark portions 91A is positioned farther radially outward than the inner core portion 61A. In addition, in plan view, at least a portion of the gate mark portion 91A is positioned farther radially inward than the through-hole 621A.

When the rotor 32A is manufactured, first, the laminated core 51A and the plurality of magnets 52A are disposed inside a mold. At this time, the plurality of outer core portions 62A and the plurality of magnets 52A are alternately arranged in the circumferential direction. Next, a molten resin is injected into the mold via the gate of the mold. The gate is positioned farther radially outward than the inner core portion 61A. In addition, at least a portion of the gate is positioned farther radially inward than the through-hole 621A.

The molten resin injected from the gate comes into contact with the upper surfaces of the laminated core 51A and the magnets 52A and spreads out. Here, the concentration of the injection pressure of the molten resin on the through-hole 621A is significantly reduced and prevented. Therefore, the molten resin efficiently spreads out. Here, the molten resin flows toward the upper surfaces of the laminated core 51A and the magnets 52A, the lower surfaces of the laminated core 51A and the magnets 52A, and the radial outside surfaces of the magnets 52A, and into the through-holes 621A. In addition, the molten resin solidifies to thereby obtain the resin portion 53A. Accordingly, each of the portions of the resin portion 53A is molded with favorable accuracy.

Second Preferred Embodiment

Figure 2:
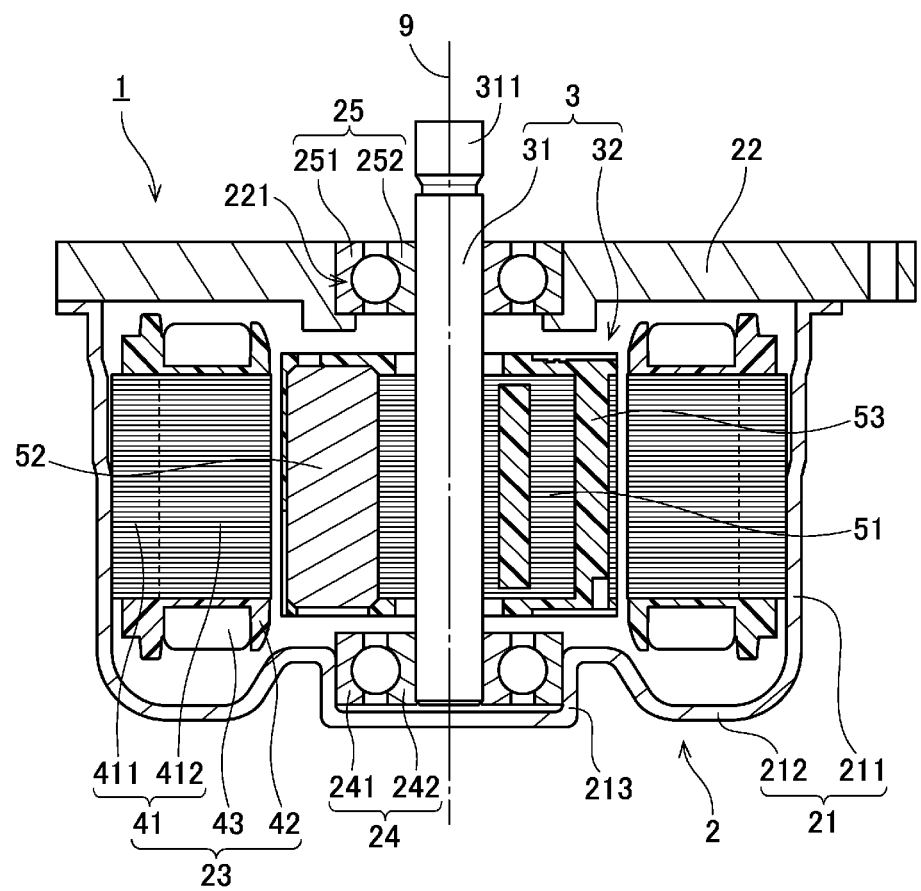
FIG. 2 is a longitudinal sectional view of a motor according to a second preferred embodiment of the present invention.

Subsequently, a second preferred embodiment of the present invention will be described. FIG. 2 is a longitudinal sectional view of a motor 1 according to the second preferred embodiment. The motor 1 in this preferred embodiment is preferably mounted in, for example, a vehicle and is used to generate a driving force for power steering. However, the motor according to various preferred embodiments of the present invention may also be used for any desirable purpose other than power steering. For example, the motor according to various preferred embodiments of the present invention may also be used as a driving source of another part of a vehicle such as an engine cooling fan, an oil pump, etc. In addition, the motor according to various preferred embodiments of the present invention may be mounted in electric appliances, office automation equipment, medical equipment, etc. to generate various driving forces, for example.

The motor 1 is a so-called inner rotor type motor in which a rotor 32 is disposed in the radial inside of an armature 23. As illustrated in FIG. 2, the motor 1 includes a stationary section 2 and a rotating section 3. The stationary section 2 is fixed to the frame body of a device which is a driving object. The rotating section 3 is rotatably supported with respect to the stationary section 2.

The stationary section 2 in this preferred embodiment preferably includes a housing 21, a lid portion 22, the armature 23, a lower bearing portion 24, and an upper bearing portion 25.

The housing 21 preferably includes a side wall 211 of a substantially cylindrical shape and a bottom portion 212 that blocks the lower portion of the side wall 211. The lid portion 22 covers the opening of the upper portion of the housing 21. The armature 23 and the rotor 32, which will be described later, are accommodated in an internal space surrounded by the housing 21 and the lid portion 22. At the center of the bottom portion 212 of the housing 21, a concave portion 213 arranged to support the lower bearing portion 24 is provided. In addition, at the center of the lid portion 22, a circular hole 221 arranged to support the upper bearing portion 25 is provided.

The armature 23 is disposed in the radial outside of the rotor 32 which will be described later. The armature 23 preferably includes a stator core 41, an insulator 42, and a coil 43. The stator core 41 is preferably defined by laminated steel plates in which electromagnetic steel plates are laminated in the axial direction. The stator core 41 preferably includes an annular core back 411 and a plurality of teeth 412 that protrude radially inward from the core back 411. The core back 411 is disposed on substantially the same axis as a center axis 9. In addition, the outer circumferential surface of the core back 411 is fixed to the inner circumferential surface of the side wall 211 of the housing 21. The plurality of teeth 412 are arranged at substantially equal intervals in the circumferential direction.

The insulator 42 is preferably made of a resin, which is an electrically insulating body. The upper surface, the lower surface, and both side surfaces in the circumferential direction of each of the teeth 412 are covered with the insulator 42. The coil 43 is preferably defined by conductive wires wound around the insulator 42. That is, in this preferred embodiment, the conductive wires are wound around the teeth 412 with the insulator 42 interposed therebetween. The insulator 42 is interposed between the teeth 412 and the coil 43 and thus prevents the teeth 412 and the coil 43 from being electrically short-circuited.

Alternatively, instead of the insulator 42, insulation coating may be provided on the surfaces of the teeth 412 if so desired.

The lower bearing portion 24 and the upper bearing portion 25 are respectively disposed between the housing 21 and the lid portion 22, and a shaft 31 on the rotating section 3. In the lower bearing portion 24 and the upper bearing portion 25 in this preferred embodiment, a ball bearing that rotates an outer race and an inner race relative to each other through spherical bodies is preferably used. However, instead of the ball bearing, other types of bearings such as, for example, sliding bearings, fluid bearings, etc. may also be used.

An outer race 241 of the lower bearing portion 24 is disposed in the concave portion 213 of the housing 21 to be fixed to the housing 21. In addition, an outer race 251 of the upper bearing portion 25 is disposed in the circular hole 221 of the lid portion 22 to be fixed to the lid portion 22. On the other hand, inner races 242 and 252 of the lower bearing portion 24 and the upper bearing portion 25 are fixed to the shaft 31. Accordingly, the shaft 31 is rotatably supported with respect to the housing 21 and the lid portion 22.

Figure 3:
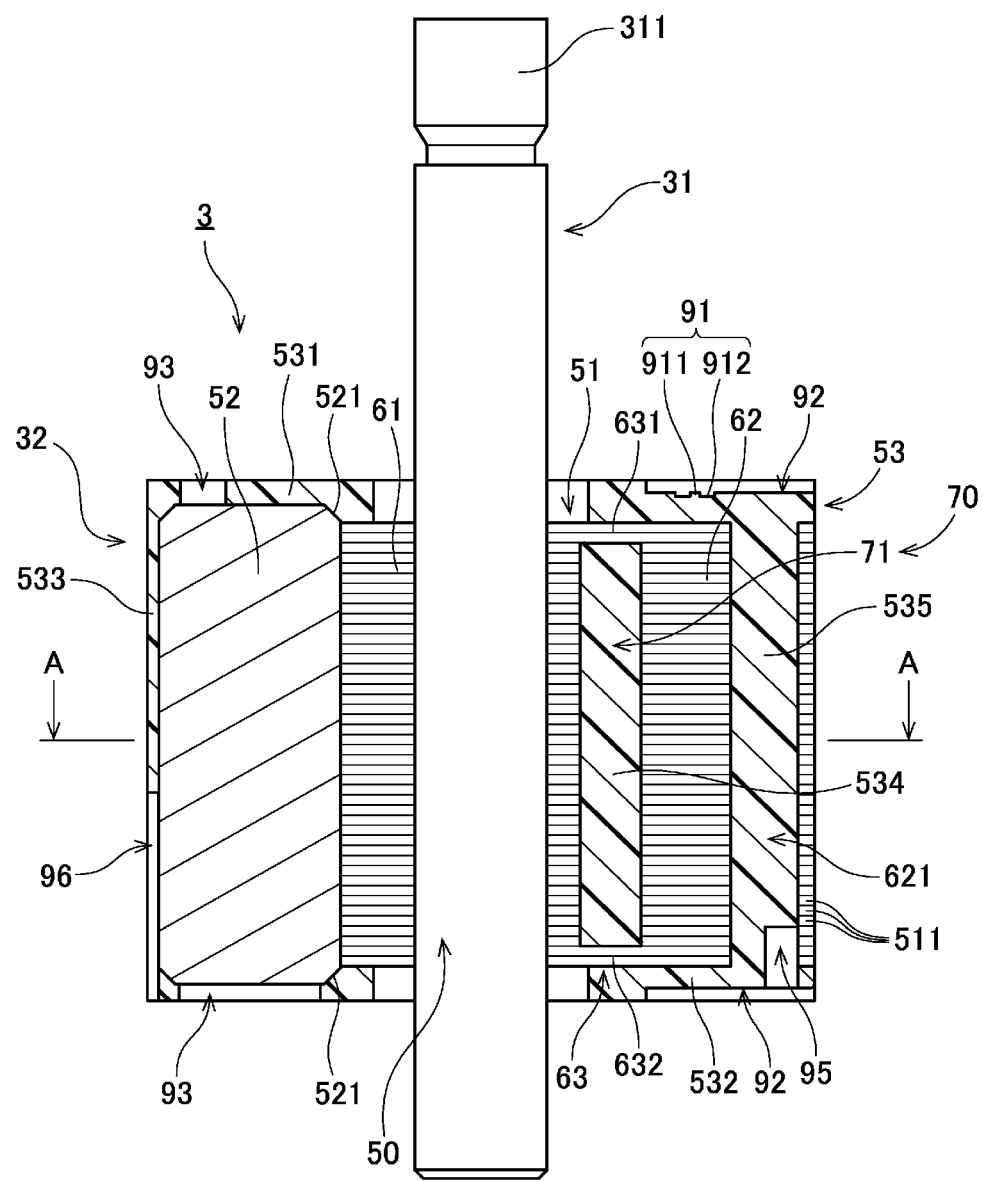
FIG. 3 is a longitudinal sectional view of a rotating section according to the second preferred embodiment of the present invention.

FIG. 3 is a longitudinal sectional view of the rotating section 3. As illustrated in FIGS. 2 and 3, the rotating section 3 in this preferred embodiment includes the shaft 31 and the rotor 32.

The shaft 31 is preferably a columnar member extending along the center axis 9. Stainless steel, for example, is preferably used as the material of the shaft 31. The shaft 31 is supported by the lower bearing portion 24 and the upper bearing portion 25 described above, and at the same time rotates about the center axis 9. In addition, the shaft 31 preferably includes a head portion 311 protruding further upward than the lid portion 22. The head portion 311 is preferably connected to a part which is the driving object with a power transmission mechanism such as, for example, gears.

The rotor 32 is disposed radially inside of the armature 23 and rotates along with the shaft 31. The rotor 32 preferably includes a laminated core 51, a plurality of magnets 52, and a resin portion 53. The laminated core 51 is preferably defined by a plurality of thin plate cores 511 which are electromagnetic steel plates. The plurality of thin plate cores 511 are laminated in the axial direction to define laminated steel plates. When the laminated steel plates are used, eddy currents that occur in the laminated core 51 may be significantly reduced and prevented. Therefore, magnetic flux can efficiently flow in the laminated core 51. A through-hole 50 extending in the axial direction is preferably provided at the center of the laminated core 51. The shaft 31 is preferably press-fitted into the through-hole 50 of the laminated core 51.

The plurality of magnets 52 are arranged at substantially equal intervals in the circumferential direction around the center axis 9. In this preferred embodiment, the magnet 52 preferably having a substantially rectangular parallelepiped shape is used. However, any other disable shape of could be used for the magnet 52. Both end surfaces in the axial direction of the laminated core 51 and the plurality of magnets 52, and the radially outside surfaces of the magnets 52 are preferably covered with the resin portion 53. Accordingly, upward, downward, or radially outward movement of the magnets 52 with respect to the rotor 32 is prevented. In addition, the rigidity of the entire rotor 32 is enhanced by the resin portion 53. In addition, the more detailed structure of the rotor 32 will be described later.

In the motor 1, when a driving current is applied to the coil 43 of the stationary section 2, magnetic flux is generated in the plurality of teeth 412. In addition, a torque in the circumferential direction is generated by the interaction of the magnetic flux of the teeth 412 with that of the rotor 32. As a result, the rotating section 3 rotates about the center axis 9 with respect to the stationary section 2.

Figure 4:
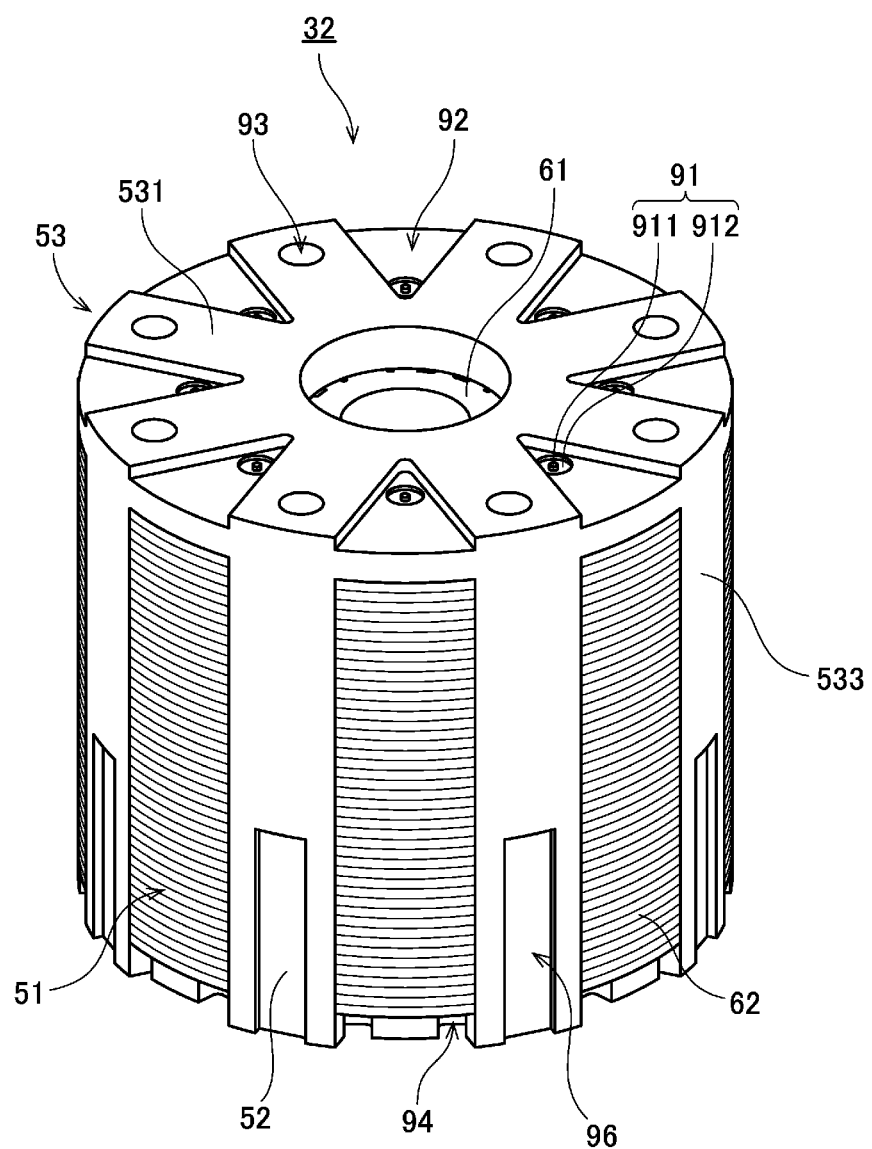
FIG. 4 is a perspective view of the rotor according to the second preferred embodiment of the present invention.
Figure 5:
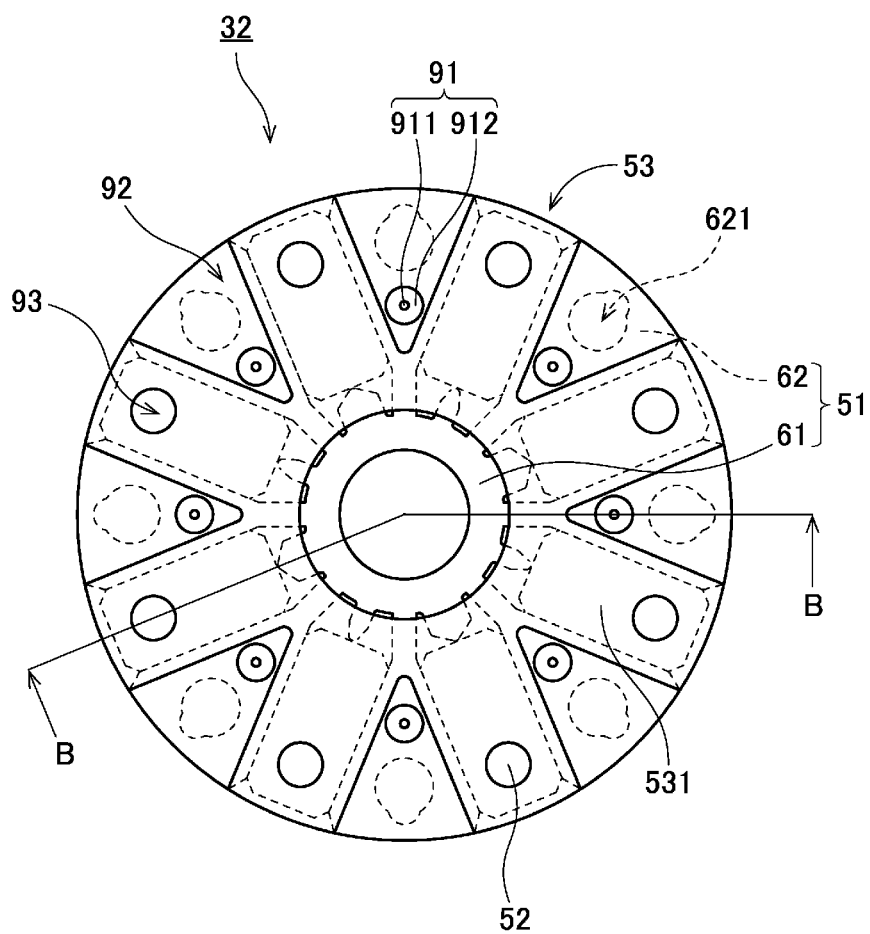
FIG. 5 is a plan view of the rotor according to the second preferred embodiment of the present invention.
Figure 6:
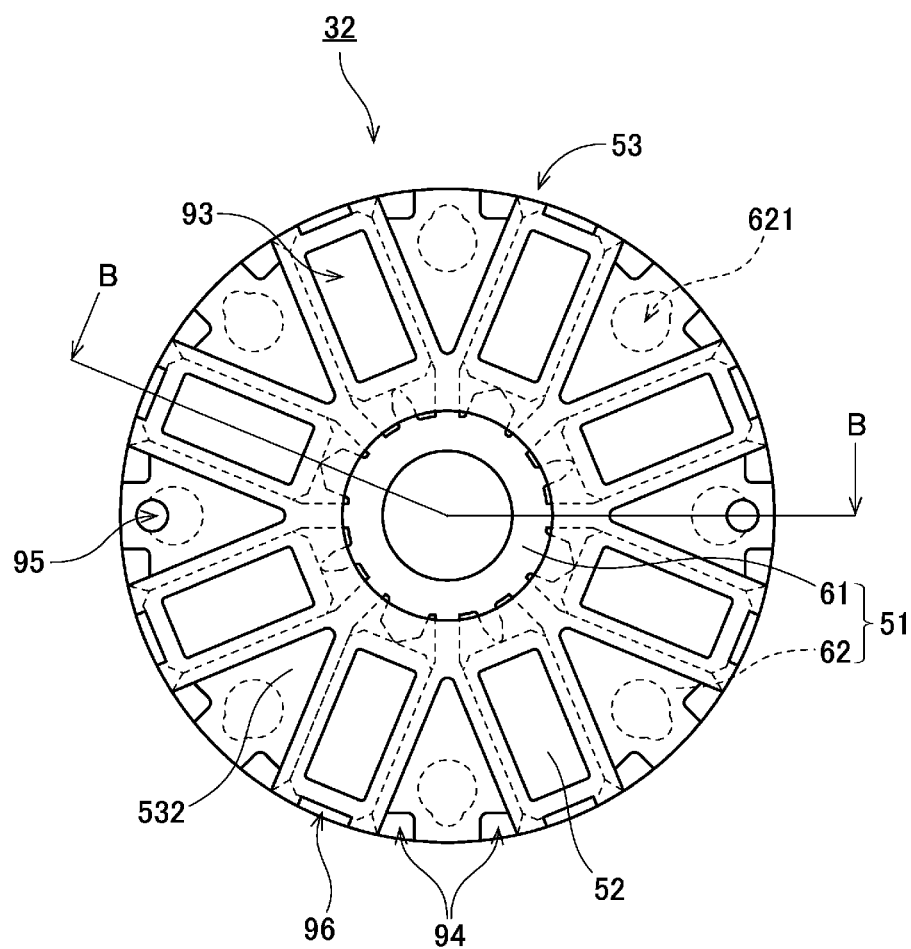
FIG. 6 is a bottom view of the rotor according to the second preferred embodiment of the present invention.
Figure 7:
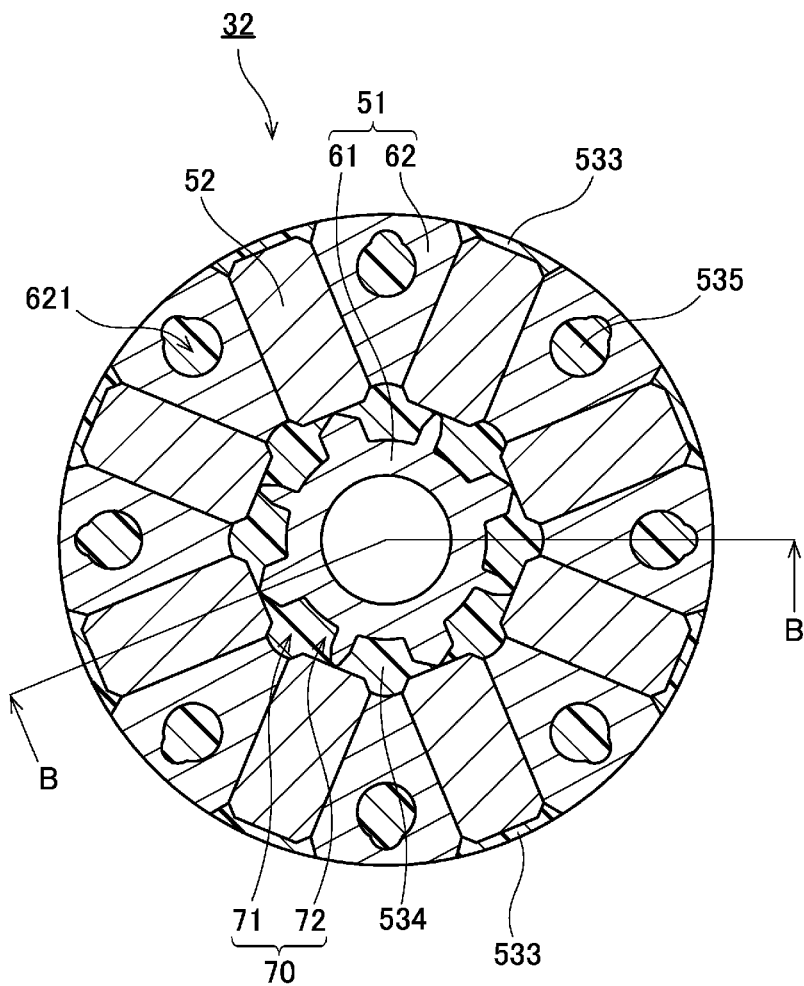
FIG. 7 is a transverse sectional view of the rotor according to the second preferred embodiment of the present invention.
Figure 8:
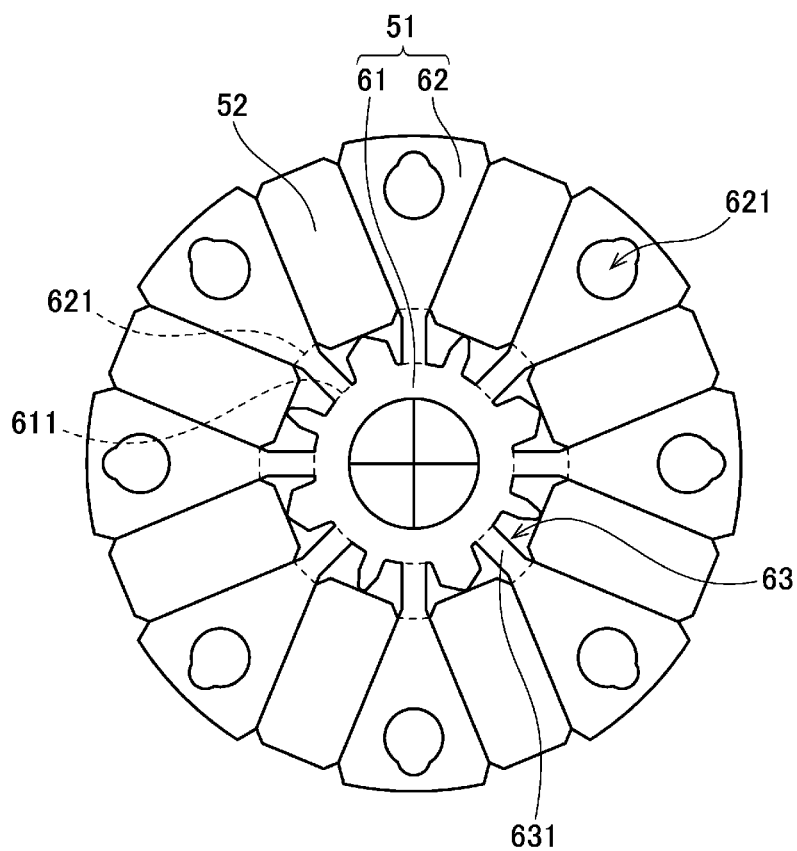
FIG. 8 is a plan view of a laminated core and a plurality of magnets according to the second preferred embodiment of the present invention.

Subsequently, the more detailed structure of the rotor 32 will be described. FIG. 4 is a perspective view of the rotor 32. FIG. 5 is a plan view of the rotor 32. FIG. 6 is a bottom view of the rotor 32. FIG. 7 is a transverse sectional view of the rotor 32 viewed from the position A-A in FIG. 3. FIG. 8 is a plan view of the laminated core 51 and the plurality of magnets 52. The following description will be provided with reference to FIGS. 4 and 8 as well as FIG. 3. In addition, the longitudinal section of the rotor 32 in FIG. 3 corresponds to the position B-B in FIGS. 5 to 7.

As illustrated in FIGS. 3 to 8, the laminated core 51 includes an inner core portion 61 and a plurality of outer core portions 62. The inner core portion 61 axially extends in the cylindrical shape in a region located farther radially inward than the magnets 52. The plurality of outer core portions 62 are arranged at substantially equal intervals in the circumferential direction in a region located farther radially outward than the inner core portion 61. As illustrated in FIGS. 7 and 8, each of the outer core portions 62 has a substantially fan shaped external shape in plan view and extends in the axial direction.

In addition, as illustrated in FIGS. 3 and 5 to 8, each of the outer core portions 62 preferably includes a through-hole 621. The through-hole 621 penetrates through the outer core portion 62 in the axial direction. In this preferred embodiment, the center in the radial direction of the through-hole 621 is positioned farther radially outward than the center in the radial direction of the outer core portion 62.

In addition, as illustrated in FIGS. 3 and 8, the laminated core 51 in this preferred embodiment includes a plurality of connection portions 63 that connect the inner core portion 61 to the plurality of outer core portions 62. Each of the connection portions 63 connects the outer circumferential surface of the inner core portion 61 to the end portion on the radial inside of the outer core portion 62 in the radial direction. The relative positional relationship between the inner core portion 61 and the plurality of outer core portions 62 is fixed by the connection portions 63. Therefore, during the injection molding of the resin portion 53 which will be described later, the inner core portion 61 and the plurality of outer core portions 62 can be easily positioned in the mold.

In addition, in FIG. 8, the outer circumferential surface of the inner core portion 61 at the position in the axial direction where the connection portion 63 is not provided is shown by a broken line 611. In addition, in FIG. 8, the end portion on the radial inside of the outer core portion 62 at the position in the axial direction where the connection portion 63 is not provided is shown by a broken line 621. The connection portion 63 is a portion interposed between the broken lines 611 and 621 in plan view.

The plurality of magnets 52 are arranged between the adjacent outer core portions 62. That is, the plurality of magnets 52 and the plurality of outer core portions 62 are alternately arranged in the circumferential direction. Each of the magnets 52 includes a pair of end surfaces in the circumferential direction which are magnetic pole surfaces. The plurality of magnets 52 are arranged so that the magnetic pole surfaces of the same pole face each other in the circumferential direction. Each of the outer core portions 62 is magnetized by the magnets 52 disposed on both sides thereof. As a result, the radially outside surface of the outer core portion 62 is the magnetic pole surface. That is, most of the magnetic flux generated by the magnets 52 flows to the radially outward of the outer core portion 62 through the outer core portion 62.

As the magnet 52, for example, a ferrite-based sintered magnet or a neodymium magnet is preferably used. However, recently, the price of neodymium which is a rare earth element has soared, and it has become difficult to use the neodymium magnet. For this reason, there is a high technical demand for obtaining a strong magnetic force while using the ferrite-based sintered magnet. In this respect, as in this preferred embodiment, by alternately arranging the plurality of outer core portions 62 and the plurality of magnets 52, the volume ratio of the magnets 52 in the rotor 32 can increase. In addition, the magnetic flux generated by the pair of magnetic pole surfaces of each of the magnets 52 can be effectively used. Therefore, it is possible to use ferrite-based sintered magnet and, at the same time, to obtain a strong magnetic force.

As illustrated in FIG. 3, the magnets 52 in this preferred embodiment preferably have tapered surfaces 521 at the boundary between the upper surface thereof and each of both end surfaces in the circumferential direction and both end surfaces in the radial direction, and at the boundary between the lower surface thereof and each of both end surfaces in the circumferential direction and both end surfaces in the radial direction. In addition, the upper surface, the lower surface, and the tapered surfaces 521 of the magnet 52 are positioned more axially outward than both end surfaces in the axial direction of the laminated core 51. In this case, substantially the entire end surfaces in the circumferential direction of the outer core portion 62 come into contact with the end surfaces in the circumferential direction of the magnet 52. That is, compared to a case where the upper surface, the lower surface, and the tapered surfaces 521 of the magnet 52 are positioned farther axially inward than both end surfaces in the axial direction of the laminated core 51, the contact area between the end surfaces in the circumferential direction of the outer core portion 62 and the end surfaces in the circumferential direction of the magnet 52 is increased. Therefore, the loss of the magnetic flux due to the tapered surfaces 521 is significantly reduced and prevented, and thus the magnetic flux of the magnets 52 can be effectively used.

In addition, the tapered surfaces 521 may be provided at only one of the boundaries between the upper surface of the magnet 52 and each of both end surfaces in the circumferential direction and both end surfaces in the radial direction and the boundary between the lower surface of the magnet 52 and each of both end surfaces in the circumferential direction and both end surfaces in the radial direction. In addition, only one of the upper surface and the lower surface of the magnet 52 may be positioned more axially outward than both end surfaces in the axial direction of the laminated core 51.

The resin portion 53 is preferably obtained by, for example, performing injection molding of a resin such as polycarbonate. During injection molding of the resin portion 53, after the laminated core 51 and the plurality of magnets 52 are disposed inside a mold in advance, a molten resin is injected into the mold. That is, insert molding is performed using the laminated core 51 and the plurality of magnets 52 as insert components. Accordingly, the resin portion 53 is molded, and the laminated core 51, the plurality of magnets 52, and the resin portion 53 are fixed to each other.

As illustrated in FIGS. 3 to 7, the resin portion 53 in this preferred embodiment preferably includes an upper resin portion 531, a lower resin portion 532, an outer resin portion 533, an inner resin portion 534, and a columnar portion 535.

The upper resin portion 531 spreads in an annular shape on the upper side of the laminated core 51 and the plurality of magnets 52 and on the radial outside of the shaft 31. The upper surface of the outer core portion 62 and the upper surface of the magnet 52 are covered with the upper resin portion 531. The lower resin portion 532 spreads in an annular shape on the lower side of the laminated core 51 and the plurality of magnets 52 and on the radial outside of the shaft 31. The lower surface of the outer core portion 62 and the lower surface of the magnet 52 are covered with the lower resin portion 532.

The outer resin portion 533 is positioned on the radial outside of the magnet 52 and between the adjacent outer core portions 62. The radially outside surface of the magnet 52 is covered with the outer resin portion 533. The inner resin portion 534 preferably fills a magnetic gap 70 positioned between the inner core portion 61, the outer core portion 62, and the magnet 52. In addition, the columnar portion 535 extends in the axial direction inside the through-hole 621.

As illustrated in FIG. 3, the plurality of connection portions 63 of the laminated core 51 preferably include a plurality of upper connection portions 631 and a plurality of lower connection portions 632. The upper connection portions 631 are positioned higher in the axial direction of the laminated core 51 than the center of the laminated core 51 and are preferably defined by a single or a plurality of thin plate cores 511 at the top. The lower connection portions 632 are positioned lower in the axial direction of the laminated core 51 than the center of the laminated core 51 and are preferably defined by a single or a plurality of thin plate cores 511 at the bottom.

The magnetic gap 70 described above preferably includes a first magnetic gap 71 and a second magnetic gap 72. The first magnetic gap 71 is positioned between the upper connection portion 631 and the lower connection portion 632. The second magnetic gap 72 is positioned at a position in the circumferential direction between the adjacent outer core portions 62, on the radial outside of the inner core portion 61, and on the radial inside of the magnet 52. Accordingly, the leakage of the magnetic flux from the outer core portion 62 and the magnet 52 to the inner core portion 61 is significantly reduced and prevented. In this preferred embodiment, both the first magnetic gap 71 and the second magnetic gap are filled with the inner resin portion 534 which is a non-magnetic body. Accordingly, the rigidity of the rotor 32 is further increased.

The upper end portions of the outer resin portion 533, the inner resin portion 534, and the columnar portion 535 are connected to the upper resin portion 531. In addition, the lower end portions of the outer resin portion 533, the inner resin portion 534, and the columnar portion 535 are connected to the lower resin portion 532. That is, the upper resin portion 531 and the lower resin portion 532 are connected with the outer resin portion 533, the inner resin portion 534, and the columnar portion 535 in the axial direction. Accordingly, the rigidity of the resin portion 53 that includes the upper resin portion 531, the lower resin portion 532, the outer resin portion 533, the inner resin portion 534, and the columnar portion 535 is increased.

In addition, as illustrated in FIGS. 3 to 5, the resin portion 53 includes a gate mark portion 91 on the upper surface of the upper resin portion 531. The gate mark portion 91 is preferably positioned above the outer core portion 62. The gate mark portion 91 is arranged at a point where the gate of the mold is positioned during injection molding of the resin portion 53. The gate mark portion 91 preferably includes a center protruding portion 911 and an annular concave portion 912 provided in the periphery of the center protruding portion 911. In plan view, the area of the center protruding portion 911 is substantially the same as the area of a gate hole through which the molten resin is discharged. In addition, in plan view, the area of the annular concave portion 912 is substantially the same as the area of a convex portion in the periphery of the gate hole.

In the motor 1, the gate mark portion 91 is positioned farther radially outward than the inner core portion 61. In addition, in plan view, at least a portion of the gate mark portion 91 is positioned farther radially inward than the through-hole 621. During, for example, injection molding which will be described later, the molten resin discharged from the gate comes into contact with the upper surfaces of the outer core portions 62 and spreads out. Here, the concentration of the injection pressure of the molten resin on the through-hole 621 is significantly reduced and prevented. Therefore, the molten resin efficiently spreads out. As a result, each of the portions of the resin portion 53 is molded with favorable accuracy.

Particularly, the molten resin discharged from the gate efficiently flows radially outward of the magnets 52 and the radial inside of the magnets 52 and the outer core portions 62, and into the space of each of the through-holes 621. As a result, the outer resin portion 533, the inner resin portion 534, and the columnar portion 535 are molded with favorable accuracy.

In this preferred embodiment, the thickness in the radial direction of the outer resin portion 533 is smaller than the thickness in the radial direction of the columnar portion 535 and the thickness in the radial direction of the inner resin portion 534. In this case, the accommodation space of the magnets 52 is easily secured. Therefore, a stronger magnetic force may be obtained while using the ferrite-based sintered magnets.

In addition, in this preferred embodiment, the gate mark portion 91 is preferably positioned not above the magnet 52 but above the outer core portion 62. Therefore, the molten resin discharged from the gate comes into contact with the upper surface of the outer core portion 62 other than the upper surface of the magnet 52. In this case, any position shift of the magnet 52 due to the injection pressure of the molten resin may be significantly reduced and prevented.

In addition, as illustrated in FIGS. 3 to 5, in this preferred embodiment, a plurality of concave portions 92 are preferably provided on the upper surface of the upper resin portion 531 and on the lower surface of the lower resin portion 532. Each of the concave portions 92 overlaps the outer core portion 62 in the axial direction. As described above, in this preferred embodiment, both end portions in the axial direction of the magnets 52 protrude vertically from both end portions in the axial direction of the outer core portions 62. However, due to the concave portions 92, the difference between the thickness in the axial direction of the resin positioned on the upper side and the lower side of the magnet 52 and the thickness in the axial direction of the resin positioned on the upper side and the lower side of the outer core portion 62 is reduced. That is, the thicknesses of the upper resin portion 531 and the lower resin portion 532 are made substantially uniform over the entire circumference. In this case, during injection molding, a change caused by the difference in the thickness of the resin may preferably be prevented. Therefore, the upper resin portion 531 and the lower resin portion 532 are molded with more favorable accuracy. In addition, in this preferred embodiment, in the concave portion 92 of the upper resin portion 531, the gate mark portion 91 is positioned.

In addition, as illustrated in FIGS. 3 to 6, each of the upper resin portion 531 and the lower resin portion 532 preferably include a plurality of first positioning holes 93. Each of the first positioning holes 93 penetrates through the upper resin portion 531 or the lower resin portion 532 in the axial direction at a position that overlaps the magnet 52 in the axial direction. The first positioning holes 93 preferably include first pins that define a portion of the mold during injection molding of the resin portion 53. The first pins abut on the upper surface and the lower surface of the magnet 52. Accordingly, in the mold, the magnets 52 are positioned in the axial direction.

In addition, as illustrated in FIGS. 4 and 6, the lower resin portion 532 in this preferred embodiment preferably includes a plurality of second positioning holes 94. Each of the second positioning holes 94 penetrates through the lower resin portion 532 in the axial direction at a position that overlaps the outer core portion 62 in the axial direction. The second positioning holes 94 preferably include second pins (not illustrated) that define a portion of the mold during injection molding of the resin portion 53. The second pins (not illustrated) abut on the lower surface of the outer core portion 62. Accordingly, in the mold, the laminated core 51 is positioned in the axial direction.

In this preferred embodiment, the second positioning holes 94 preferably are provided only in the lower resin portion 532. However, the second positioning holes may also be provided only in the upper resin portion 531 or both the upper resin portion 531 and the lower resin portion 532.

In addition, as illustrated in FIGS. 3 and 6, the resin portion 53 in this preferred embodiment preferably includes a plurality of third positioning holes 95. Each of the third positioning holes 95 is recessed from the lower surface of the lower resin portion 532 toward the columnar portion 535 at a position that overlaps the through-hole 621 of the outer core portion 62 in the axial direction. The third positioning holes 95 preferably include third pins that define a portion of the mold during injection molding of the resin portion 53. The third pins are inserted into the through-holes 621 of the outer core portions 62. Accordingly, in the mold, the laminated core 51 is positioned in the circumferential direction.

As illustrated in FIGS. 3 and 6, in this preferred embodiment, the third positioning hole 95 is preferably positioned farther radially outward than the center of the through-hole 621. However, the third positioning hole 95 may also be positioned farther radially inward than the center of the through-hole 621.

In addition, as illustrated in FIGS. 3, 4, and 6, in this preferred embodiment, a plurality of cut-outs 96 are preferably provided in the outer resin portion 533. The cut-outs 96 penetrate through the outer resin portion 533 in the radial direction on the radial outside of the magnets 52. In this preferred embodiment, the cut-outs 96 are provided only in the vicinity of the lower portion of the outer resin portion 533. However, the cut-outs 96 may extend in the axial direction from the lower end portion to the upper end portion of the outer resin portion 533. The cut-outs 96 preferably include fourth pins that define a portion of the mold during injection molding of the resin portion 53. The fourth pins abut on the radially outside surfaces of the magnets 52. Accordingly, the magnets 52 are positioned in the radial direction.

In addition, as illustrated in FIGS. 3, 4, and 7, in this preferred embodiment, the radially outside surfaces of the outer core portions 62 are exposed from the resin portion 53. In addition, the position in the radial direction of the radially outside surface of the outer core portion 62 and the position in the radial direction of the radially outside surface of the outer resin portion 533 are preferably substantially the same. In this case, the radially outside surface of the outer core portion 62 can be placed in proximity to the armature 23. As a result, the efficiency of the motor 1 may further be increased.

Figure 9:
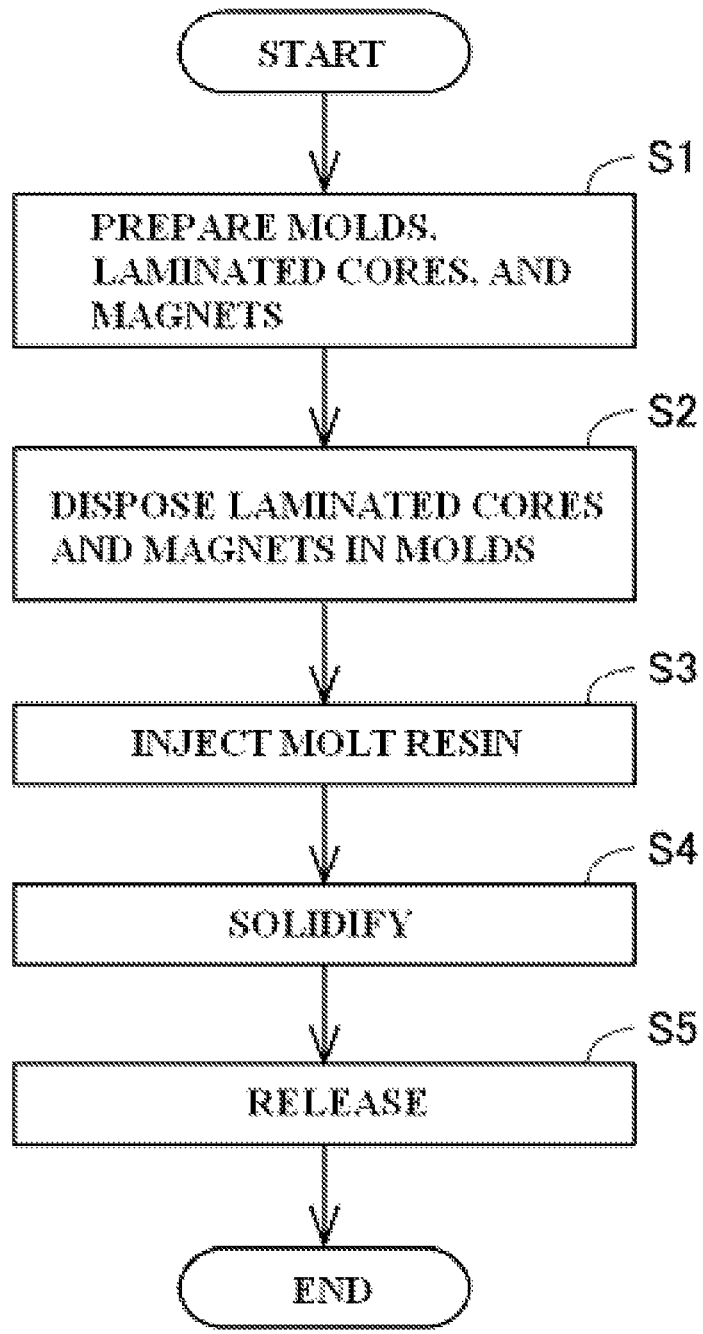
FIG. 9 is a flowchart showing the manufacturing order of the rotor according to the second preferred embodiment of the present invention.
Figure 10:
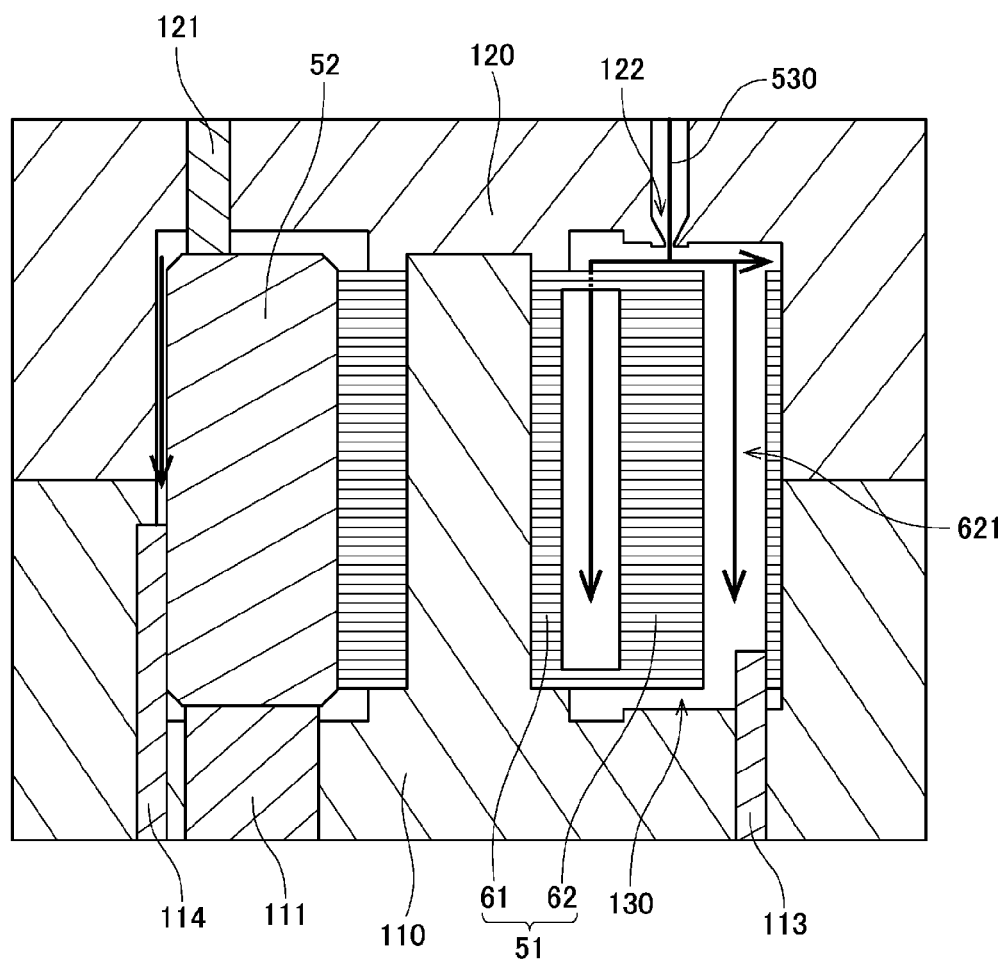
FIG. 10 is a longitudinal sectional view illustrating a form during manufacturing of the rotor according to the second preferred embodiment of the present invention.
Figure 11:
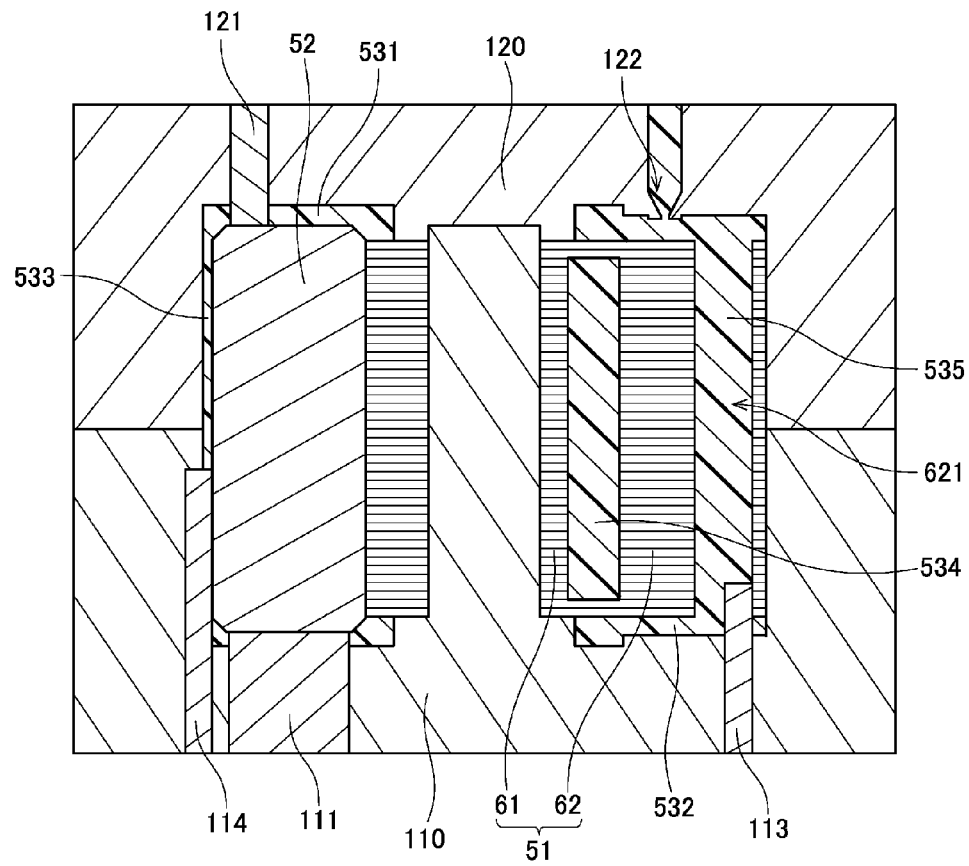
FIG. 11 is a longitudinal sectional view illustrating a form during manufacturing of the rotor according to the second preferred embodiment of the present invention.

Subsequently, a non-limiting example of a manufacturing process of the rotor 32 in accordance with a preferred embodiment of the present invention will be described. FIG. 9 is a flowchart showing the manufacturing order of the rotor 32 in accordance with a preferred embodiment of the present invention. FIGS. 10 and 11 are longitudinal sectional views illustrating a form during manufacturing of the rotor 32.

When the rotor 32 is manufactured, first, a pair of molds 110 and 120, the laminated core 51 manufactured in advance, and the plurality of magnets 52 manufactured in advance are prepared (Step S1). The pair of molds 110 and 120 which define a cavity 130 corresponding to the shape of the rotor 32 therein by causing their opposing surfaces to abut on each other are used. In addition, as illustrated in FIGS. 10 and 11, in this preferred embodiment, the lower mold 110 preferably includes a first pin 111, a second pin (not illustrated), a third pin 113, and a fourth pin 114. In addition, the upper mold 120 preferably includes a first pin 121 and a gate 122.

Next, the laminated core 51 and the plurality of magnets 52 are disposed inside the pair of molds 110 and 120 (Step S2). Here, first, the laminated core 51 and the plurality of magnets 52 are disposed inside the lower mold 110. In addition, the upper portion of the mold 110 is closed by the upper mold 120. Accordingly, the cavity 130 is defined in the molds 110 and 120, and the laminated core 51 and the plurality of magnets 52 are disposed in the cavity 130.

In Step S2, the plurality of outer core portions 62 and the plurality of magnets 52 are alternately arranged in the circumferential direction. In addition, as illustrated in FIG. 10, the first pins 111 and 121 respectively abut on the lower surface and the upper surface of the magnets 52. Accordingly, the magnets 52 are positioned in the axial direction. In addition, the second pin (not illustrated) abuts on the lower surface of the outer core portions 62. Accordingly, the laminated core 51 is positioned in the axial direction. In addition, the third pin 113 is inserted into the through-hole 621 of the outer core portion 62. Accordingly, the laminated core 51 is positioned in the circumferential direction. In addition, the fourth pin 114 abuts on the radially outside surface of the magnet 52. Accordingly, the magnets 52 are positioned in the radial direction.

Subsequently, a molten resin 530 is injected into the cavity 130 in the molds 110 and 120 (Step S3). Here, as shown by thick arrows in FIG. 10, the molten resin 530 is preferably injected into the cavity 130 in the molds 110 and 120 from the gate 122. The gate 122 is positioned farther radially outward than the inner core portion 61 disposed in the molds 110 and 120. In addition, in plan view, the entire gate 122 is positioned farther radially inward than the through-hole 621. The gate 122 faces the upper surface of the outer core portion 62 in the axial direction.

The molten resin 530 discharged from the gate 122 comes into contact with the upper surface of the outer core portions 62 and spreads out along the upper surfaces of the laminated core 51 and the plurality of magnets 52. Thereafter, the molten resin 530 preferably flows toward the radial outside of the magnets 52 and the radial inside of the magnets 52 and the outer core portions 62 and through the spaces in the through-holes 621 to the lower surface side of the laminated core 51 and the plurality of magnets 52. Accordingly, the molten resin 530 efficiently and uniformly flows into the cavity 130 in the molds 110 and 120. As a result, each of the portions of the resin portion 53 is molded with favorable accuracy.

When the molten resin 530 uniformly flows into the cavity 130 in the molds 110 and 120, subsequently, the molten resin 530 in the molds 110 and 120 is cooled to solidify (Step S4). The molten resin 530 in the molds 110 and 120 solidifies and becomes the resin portion 53. As illustrated in FIG. 11, the resin portion 53 is molded to have the upper resin portion 531, the lower resin portion 532, the outer resin portion 533, the inner resin portion 534, and the columnar portion 535. In addition, as the molten resin 530 solidifies, the laminated core 51, the magnets 52, and the resin portion 53 are fixed to each other.

Thereafter, the pair of molds 110 and 120 are opened, the rotor 32 is released from the molds 110 and 120 (Step S5).

Modified Preferred Embodiments

Exemplary preferred embodiments of the present invention have been described above, however, the present invention is not limited to the above preferred embodiments.

For example, only a portion of the gate and the gate mark portion may be positioned farther radially inward than the through-hole. In addition, the gate and the gate mark portion may be positioned above the magnets. The number of connection portions that connect the inner core portion to each of the outer core portions may be 1 or any number higher than or equal to 3. In addition, the shape of the through-hole provided in each of the outer core portions may be substantially circular in plan view as illustrated in the drawings of the present application and may also be elliptical or rectangular in plan view, for example.

Besides, the shapes of the details of each member may be different from the shapes illustrated in the drawings of the present application. In addition, the elements that appear in the preferred embodiments or the modified examples may be appropriately combined without causing contradiction.

Preferred embodiments of the present invention and modifications thereof may be used for a rotor, a motor, and a manufacturing process of the rotor, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotor comprising:
a plurality of magnets which are arranged in a circumferential direction around a center axis that extends in a vertical direction;
a laminated core in which a plurality of thin plate cores are laminated in an axial direction; and
an injection molded resin portion; wherein
the laminated core includes an inner core portion which axially extends in a cylindrical shape in a region located farther radially inward than the plurality of magnets, and a plurality of outer core portions which are arranged in the circumferential direction in a region located farther radially outward than the inner core portion;
the plurality of outer core portions and the plurality of magnets are alternately arranged in the circumferential direction;
each of the plurality of magnets includes a pair of end surfaces in the circumferential direction which are magnetic pole surfaces;
the magnetic pole surfaces of the plurality of magnets of the same pole face each other in the circumferential direction;
the outer core portion includes a through-hole which penetrates in the axial direction;
the resin portion includes an upper resin portion which covers upper surfaces of the laminated core and the plurality of magnets, a lower resin portion which covers lower surfaces of the laminated core and the plurality of magnets, an outer resin portion which covers radially outside surfaces of the plurality of magnets, and a columnar portion which extends in the axial direction in the through-hole and connects the upper resin portion to the lower resin portion;
the resin portion includes a gate mark portion at which a gate of a mold is positioned during injection molding;
the gate mark portion is positioned farther radially outward than the inner core portion; and
at least a portion of the gate mark portion is positioned farther radially inward than the through-hole in plan view.

2. The rotor according to claim 1, wherein
a magnetic gap is provided radially outside of the inner core portion and radially inside of the plurality of magnets;
the resin portion further includes an inner resin portion that fills the magnetic gap; and
the upper resin portion and the lower resin portion are connected in the axial direction with the outer resin portion, the columnar portion, and the inner resin portion.

3. The rotor according to claim 2, wherein a thickness in the radial direction of the outer resin position is smaller than any of a thickness in the radial direction of the columnar portion and a thickness in the radial direction of the inner resin portion.

4. The rotor according to claim 1, wherein at least one of the upper surface and the lower surface of the plurality of magnets is positioned more axially outward than both end surfaces in the axial direction of the laminated core.

5. The rotor according to claim 1, wherein the plurality of magnets include tapered surfaces at least one of a boundary between the upper surface thereof and each of both end surfaces in the circumferential direction and both end surfaces in the radial direction, and a boundary between the lower surface thereof and each of both end surfaces in the circumferential direction and both end surfaces in the radial direction; and the tapered surfaces are positioned more axially outward than both end surfaces in the axial direction of the laminated core.

6. The rotor according to claim 1, wherein an upper surface of the upper resin portion and a lower surface of the lower resin portion respectively include concave portions at positions that overlap with the outer core portion in the axial direction.

7. The rotor according to claim 1, wherein the upper resin portion and the lower resin portion include first positioning holes at positions that overlap the plurality of magnets in the axial direction.

8. The rotor according to claim 1, wherein the outer resin portion includes a cut-out that penetrates in the radial direction.

9. The rotor according to claim 1, wherein at least one of the upper resin portion and the lower resin portion includes a second positioning hole at a position that overlaps the laminated core in the axial direction.

10. The rotor according to claim 1, wherein a radially outside surface of the outer core portion is exposed from the resin portion; and
    a position in the radial direction of the radially outside surface of the outer core portion and a position in the radial direction of a radially outside surface of the outer resin portion are substantially the same.

* * * * *